United States Patent
Hanley et al.

(10) Patent No.: US 12,422,115 B2
(45) Date of Patent: Sep. 23, 2025

(54) LIGHTING DEVICE WITH BATTERY BACKUP

(71) Applicant: ABL IP Holding, LLC, Conyers, GA (US)

(72) Inventors: Michael Hanley, Lawrenceville, GA (US); Bradley Dobbs, Villa Rica, GA (US)

(73) Assignee: ABL IP Holding, LLC, Atlanta, GA (US)

( * ) Notice: Subject to any disclaimer, the term of this patent is extended or adjusted under 35 U.S.C. 154(b) by 31 days.

(21) Appl. No.: 18/389,514

(22) Filed: Nov. 14, 2023

(65) Prior Publication Data

US 2025/0155096 A1 May 15, 2025

(51) Int. Cl.
| | | |
|---|---|---|
| *F21S 9/02* | (2006.01) | |
| *G08B 5/36* | (2006.01) | |
| *G08B 7/06* | (2006.01) | |
| *G09F 13/04* | (2006.01) | |
| *H02J 7/00* | (2006.01) | |
| *H02J 9/06* | (2006.01) | |
| *H05B 47/17* | (2020.01) | |

(52) U.S. Cl.
CPC ............. *F21S 9/022* (2013.01); *G08B 5/36* (2013.01); *G08B 7/062* (2013.01); *G09F 13/0418* (2021.05); *H02J 7/0068* (2013.01); *H02J 9/065* (2013.01); *H05B 47/17* (2020.01); *G09F 2013/05* (2021.05)

(58) Field of Classification Search
CPC .. F21S 9/022; G08B 7/062; G08B 5/36; H02J 9/065; H05B 47/17; H05B 47/172
See application file for complete search history.

(56) References Cited

U.S. PATENT DOCUMENTS

| | | | | |
|---|---|---|---|---|
| 5,897,194 | A * | 4/1999 | Ham | G08B 7/062 |
| | | | | 362/276 |
| 2009/0154148 | A1* | 6/2009 | Meyer | F21S 6/005 |
| | | | | 315/86 |
| 2013/0342342 | A1* | 12/2013 | Sabre | G09F 13/18 |
| | | | | 340/509 |
| 2019/0295386 | A1* | 9/2019 | Roberts | G08B 7/062 |
| 2022/0205597 | A1* | 6/2022 | Hsia | H02J 7/00302 |

OTHER PUBLICATIONS

Sure-Lites Complete Exit, SCX Series Universal Mount Edge Lit Exit Sign, Cooper Lighting Solutions, dated May 3, 2023.

* cited by examiner

*Primary Examiner* — Ryan Johnson
(74) *Attorney, Agent, or Firm* — Grossman, Tucker, Perreault & Pfleger, PLLC

(57) ABSTRACT

A lighting device controller includes a power supply, a switch, a battery, and a status indicator. The switch can be set to either an AC only or battery backup position, indicating whether the lighting device controller provides a battery backup signal to the lighted sign. When set to the battery backup position, the lighting device controller powers the lighted sign and charges the battery. If AC power is lost while in the battery backup mode, backup power is supplied from the battery to the lighted sign. The status indicators behavior changes as a function of the switch position to indicate whether AC power is present in the AC only mode or in the battery backup mode indicates one color for AC present and battery charging, and provides a second color to indicate battery not present or low.

18 Claims, 5 Drawing Sheets

LIGHTING DEVICE WITH BATTERY BACKUP

TECHNICAL FIELD

The present invention relates generally to lighting devices and, more particularly, to a lighting device that can be powered from an alternating current (AC) source or an enclosed backup battery.

BACKGROUND

Certain light fixtures, or lighting devices, illuminate instructional signs, such as showing a path to exit the building, that play important roles during emergencies. As such, power to the lighting device is critical. Such devices often are connected to an AC power source for reliability. Lighting devices powered by fixed wires connected to an AC power source can lose power during emergency situations, when the main power to the building shuts down. In this case, emergency generators are needed to provide an alternate power source to the building and the lighting device. Other lighting devices are powered by a battery contained within the fixture, and offer flexibility in where they can be mounted. Battery powered lighting devices can illuminate signs for only a limited period of time, and require the batteries to be monitored and replaced periodically. Such shortcomings limit the use of battery powered lighting devices for illuminating instructional signs in emergency situations.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
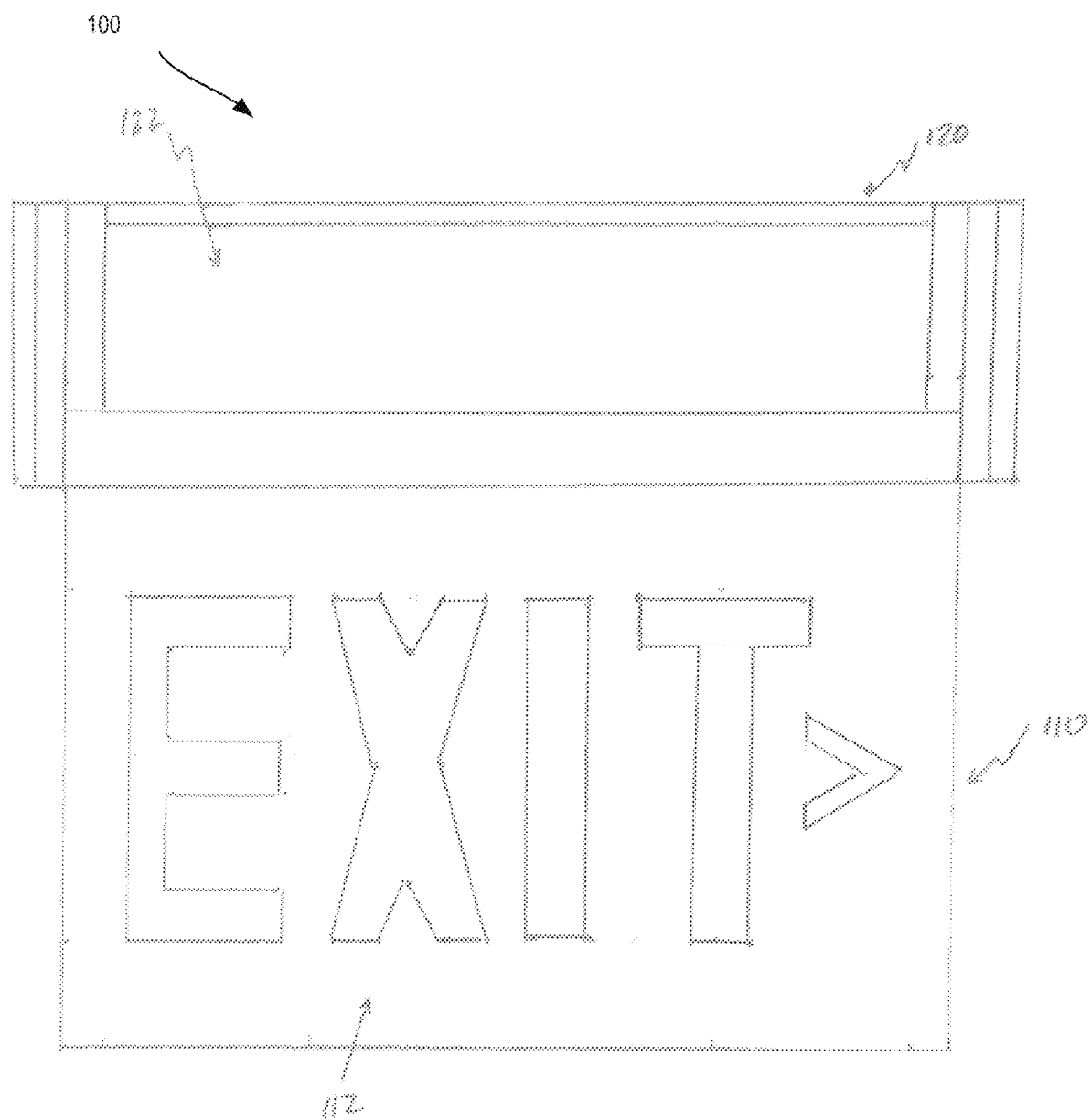
FIG. 1 is a front perspective view of a lighting device, in accordance with an embodiment of the present invention.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Light fixtures can be used to provide important instructions during emergency situations, such as what path to take when exiting a building. Such light fixtures typically include a lighted sign and a lighting device controller. The lighted sign includes illuminated instructions that can guide people through the building, and the lighting device controller provides functions necessary for effective operation of the lighting controls to the lighted sign. These light fixtures are often powered using power sources contained within the building or facility. When power is lost to the building, such light fixtures require an alternate source of power. Emergency power can be provided to the building using generators that do not rely on the same power source that powers the building. Alternatively, a light fixture that contains an additional power source within the lighting device controller, such as a backup battery, offers an improved solution that is more reliable and cost effective.

The present disclosure describes a lighting device that includes alternate power sources to illuminate an instructional sign used for emergency and non-emergency situations. The lighting device includes a switch that can be set to either battery backup mode or AC only mode. When set to battery backup mode, the lighting device uses the AC power source to illuminate the sign and to charge the backup battery. In this mode, the lighting device uses the battery to illuminate the sign when AC power is no longer provided to the device. When set to AC only mode, the lighting device uses the AC power source to illuminate the sign and provides no charge to the battery. The lighting device includes indicators to show the status of the power sources when the lighting device is in use.

FIG. 1 shows a front perspective view of an example of a light fixture 100 configured in accordance with an embodiment of the present invention. In the present embodiment, the light fixture 100 includes a lighted sign 110 and a lighting device controller 120. The top portion of the lighted sign is coupled to the bottom portion of the lighting device controller 120. In an embodiment, the lighted sign 110 includes an instructional message 112 that is continuously lit and guides people in emergency or non-emergency situations. In this particular example, the lighted sign 110 shows a direction 112 to exit the building. The lighted sign 110 typically includes a low voltage, low power lighting source, such as LEDs, to light the instructional message 112 in the sign 110. In an embodiment, the lighting device controller 120 includes a front panel 122 that can be opened and/or removed. The lighting device controller 120 performs several functions relating to the lighting controls of the lighted sign 110. In an embodiment, the lighting device controller 120 provides power to the lighted sign 110 to keep it lit continuously, which is a key function performed during emergencies. The lighting device controller 120 receives an AC power signal from a continuous power source and transforms the AC power signal into a low voltage, low power (DC) signal required for the lighted sign 110. In additional embodiments, the lighted sign 110 can provide alternate instructions 112, such as pathways to fire exits, stairwells, elevators, or restrooms. In other embodiments, the AC power signal can be transformed to a low voltage, low power signal externally from the lighting device controller 120.

Figure 2:
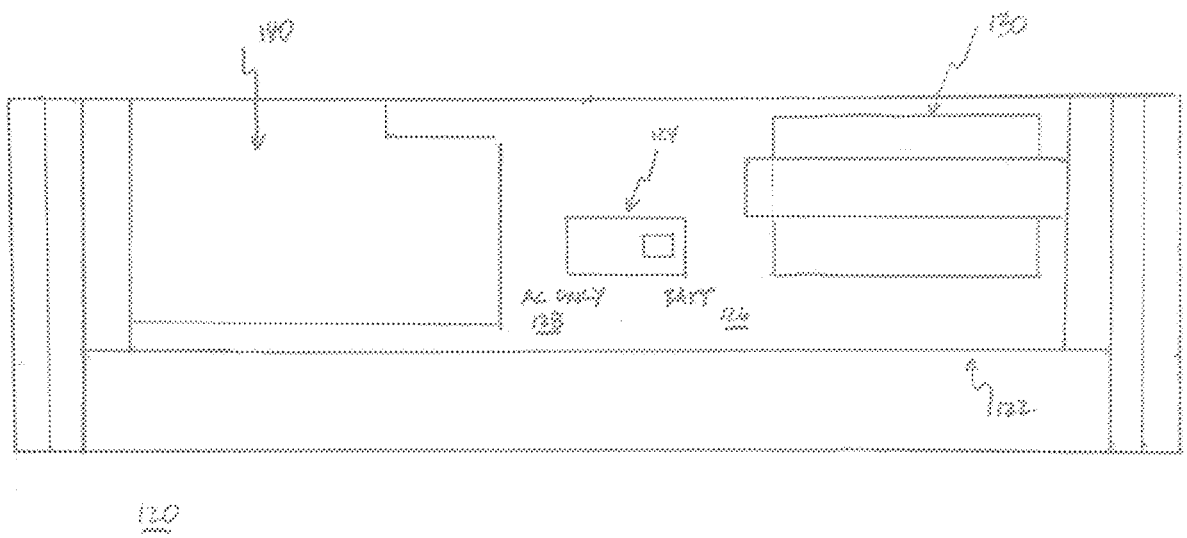
FIG. 2 is a front perspective view of the lighting device controller, having a front panel removed and showing a switch mechanism between a AC power supply only and a battery backup, in accordance with an embodiment of the present invention.

FIG. 2 shows a front perspective view of an example of the lighting device controller 120 of the light fixture 100, where the front panel 122 is removed, according to an embodiment of the present invention. In an embodiment, the lighting device controller 120 includes a power supply 140, a battery 130, and a switch 124 coupled between the power supply 140 and the battery 130. In an embodiment, the power supply 140 transforms a high voltage AC power signal into a low voltage, low power signal capable of powering the bulbs, or LEDs, in the lighted sign 110. In an embodiment, the battery 130 supplies a low power, low voltage signal that is also capable of powering the lighted sign 110. In an embodiment, the switch 124 is manually set to either the AC only position 128 or the Battery position 126. Setting the switch 124 determines how power will be supplied to the lighted sign 110, and whether the battery 130 will serve as a backup power source for the lighted sign 110. When set to the AC only position 128, the switch 124 directs the power supply 140 to be the sole power source for the LEDs within the lighted sign 110. When set to Battery position 126, the switch 124 directs the power supply 140 to be the primary power source to the lighted sign 110, and to charge the battery 130 so that the battery 130 can be used as an alternate power source to the lighted sign 110.

Figure 3:
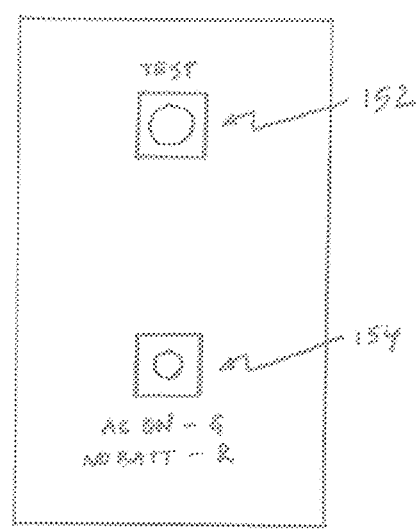
FIG. 3 is a side perspective of the lighting device controller showing a test button and a power status indicator for the lighting device controller, in accordance with an embodiment of the present invention.

FIG. 3 shows a side perspective of the lighting device controller 120 in accordance with an embodiment of the present invention. In an embodiment, the lighting device controller 120 includes a side panel 150, which further includes a Test button 152 and Status indicator 154. In an embodiment, the Test button 152 indicates whether the lighting device controller is functioning properly. More specifically, when the switch 124 is set to the battery backup position 126, the test button 152 illuminates a light, such as an LED, (and/or causes an audible sound) to indicate that the battery 130 contains sufficient charge to power the lighted sign 110, or that AC power is present in the lighting device controller 120 and the battery 130 is charging. The test button 152 is required to be tested monthly for a minimal period of thirty seconds in many jurisdictions, and annually for a longer period, such as ninety minutes. In an embodiment, the status indicator 154 indicates whether AC power is present in the lighting device controller 120. The status indicator 154 further indicates whether the battery 130 within the lighting device controller 130 is charging and/or charged. In an embodiment, the status indicator 154 can include two displays, such as LED displays, a first indicator showing the status of the AC power to the power supply 140 and a second indicator showing the status of the battery 130. In an embodiment, the first display of the status indicator 154 can be lit in a first color, such as green, when an AC power signal is received at the power supply 140, and a second color, such as red, when AC power is not present in the power supply 140. In an embodiment, the second display of the status indicator 154 can be lit in a first color, such as green, when the battery 130 is charging or completely charged, and a second color, such as red, if the battery 130 is not charging or is not sufficiently charged to power the lighted sign 110.

In an embodiment, the status indicator 154 can include a single display, such as an LED display. When the switch 124 is set to the AC power position 128, the status indicator 154 shows whether AC power is present within the lighting device controller 120 (e.g., indicator is green), and received at the power supply 140. In an embodiment, the status indicator 154 is lit to a first color, such as green, when AC power is present, and the status indicator is OFF when AC power is not present. In an embodiment, the status indicator 154 shows the status of power within the lighting device controller 120 when the switch 124 is set to the battery backup position 126. In the battery backup position the status indicator 154 may turn green when the battery is present and charging. If the battery disconnected or has insufficient power, the status indicator 154 may turn a different color, e.g., red. In the battery backup position, the status indicator 154 may be OFF when AC power is not present. In other words, the status indicator 154 shows the status of either the presence of AC power at the power supply 140 and/or the status of the charge in the battery 130. In an embodiment, the display of the status indicator 154 is lit to a first color, such as green, when AC power is present at the power supply 140 or the battery 130 is charged sufficiently to power the lighted sign 110. In an embodiment, the display of the status indicator 154 is lit to a second color, such as red, if no AC power is present at the power supply 140 and the battery 130 is not charged sufficiently to power the lighted sign 110.

Figure 4:
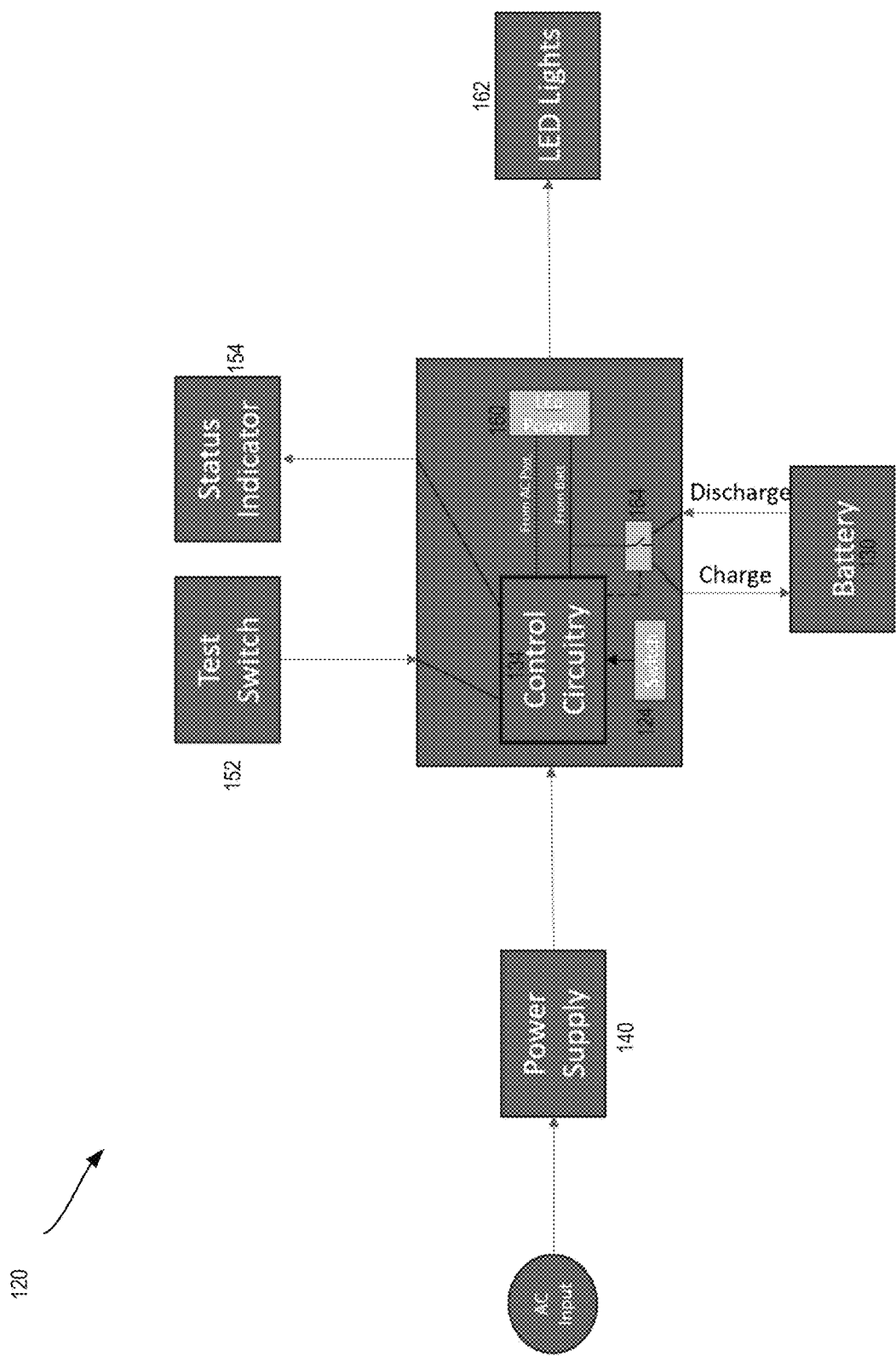
FIG. 4 is a block diagram representing the lighting device controller, in accordance with an embodiment of the present invention.

FIG. 4 illustrates a block diagram of the lighting device controller 120 according to an embodiment of the present invention. In an embodiment, the lighting device controller 120 includes an input from the AC power source, a power supply 140, control circuitry 134, a switch 124, a battery 130, a status indicator 154, a test button 152, an LED power supply 160, one or more LED lights 162 (for the sign 110), and a charge/discharge switch 164. The power supply 140 is generally configured to receive AC power and generate DC power. As described above, if switch 124 is in "AC Only" position 128, the lighting device controller 120 is configured to control the LED power supply 160 to receive the DC power from the power supply 140. The LED power supply 160 powers one or more LED devices 162. The control circuitry 134 includes circuitry and logic to determine whether the switch 124 is set to either the AC only position 128 or the battery backup position 126. In an embodiment, the control circuitry 134 is logically coupled to the battery 130, the status indicators 154, and the output to the lighted sign 110. In an embodiment, the control circuitry 134 further includes logic and circuitry to transmit a control signal to the status indicators 154 to indicate that the AC power signal is present within the lighting device controller 120. The control circuitry 134 further includes logic to determine that no charging signal is to be transmitted to the battery 130 when the switch 124 is set to the AC only mode 128. In an embodiment when the control circuitry 134 logic determines that the switch 124 is set to the battery backup position 126, the control circuitry 134 transmits the low voltage, low power signal to the output to the lighted sign 110. The control circuitry 134 further includes circuitry to transmit a charging signal to charge the battery 130 when the switch 124 is set to the battery backup mode 126. The control circuitry 134 logic and circuitry transmits a control signal to the status indicators 154 to indicate that the battery 130 is charging and the AC power signal is present within the lighting device controller 120.

In an embodiment, the control circuitry 134 includes logic to detect whether the low voltage, low power signal is present, indicating that the AC input power signal is also present at the power supply 140. When the control circuitry 134 logic determines that AC power is present and the switch 124 is set to the battery backup position 126, the control circuitry 134 transmits the low voltage, low power signal to the output to the lighted sign 110. When the control circuitry 134 logic determines that AC power is not present and the switch 124 is set to the battery backup position 126, the control circuitry 134 circuitry causes the battery 130 to discharge and to provide the low voltage, low power signal to the output to the lighted sign 110. In an embodiment, the control circuitry 134 logic and circuitry further transmits a control signal to the status indicators 154 indicating that the battery 130 is charged and supplying the power to the lighted sign 110, and the AC power signal is not present. In an embodiment when the control circuitry 134 logic determines that AC power is present and the switch is set to the AC only position 128, the control circuitry 134 transmits the low voltage, low power signal to the output of the lighted sign 110, as described previously. When the control circuitry 134 logic detects that no AC power is present and the switch 124 is set in the AC only position 128, the control circuitry 134 cannot transmit the low voltage, low power signal to the lighted sign 110, since no power signal is present. In this situation, an alternate power source, such as a generator, is needed to provide an AC power signal to the lighted device controller 120.

Figure 5:
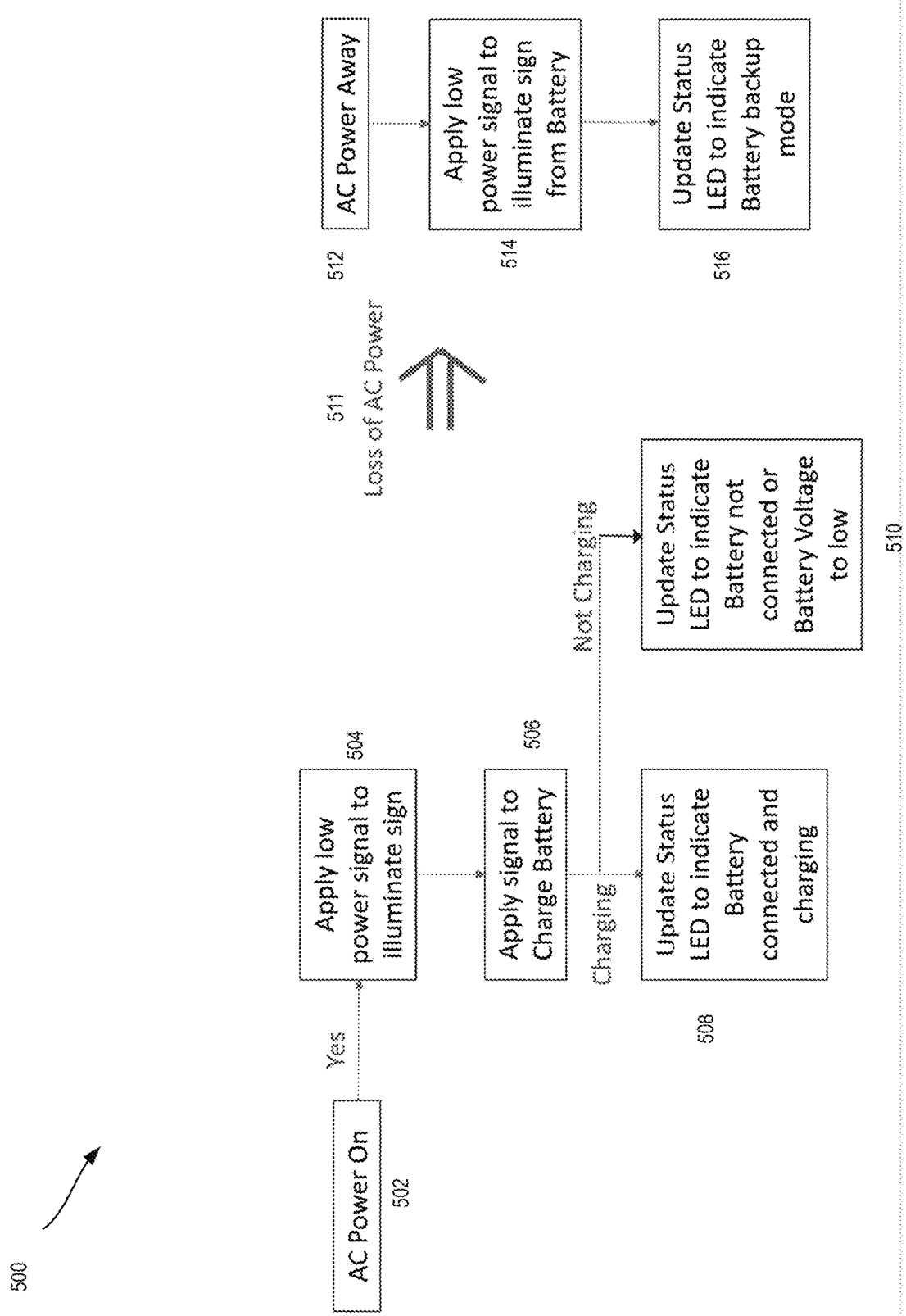
FIG. 5 is a flow diagram representing the operation of the lighting device controller in battery backup mode, in accordance with an embodiment of the present invention.

FIG. 5 represents a flow diagram of a method 500 within the lighted device controller 120 for powering the lighted sign 110 when the switch 124 is set to the battery backup position 126, in accordance with an embodiment of the present invention. The method 200 may be implemented using discrete electronic components, electronic circuitry, control logic, modules, firmware, or software. In an embodiment, the method 500 determines at method step 502 whether the AC power is present within the lighting device controller 120. If so, the method controller 120 couples DC power generated from the power supply 140 and received at the switch 124 to the LED lights of the sign 110. In addition, at step 502 the method charges the battery. In an embodiment, the method 500, at method step 508, updates the status indicators 154 to indicate that the battery 130 has power and is charging, and AC power is present in the lighting device controller 120. Alternatively, at method step 510, the method updates the status indicators 154 to indicate that the battery 130 is not connected or the voltage of the battery is low.

In an embodiment where the method 500 determines at method step 511 that AC power has been lost and is no longer present in the lighting device controller 120, the method 500 determines that AC power is off (away) 512, and the control circuitry controls the battery to deliver battery power to the LED lights 514. The method 500, at method step 516, updates the status indicators 154 to indicate that the battery 130 is charged and has power, and AC power has been lost and is no longer present in the lighting device controller 120.

Figure 6:
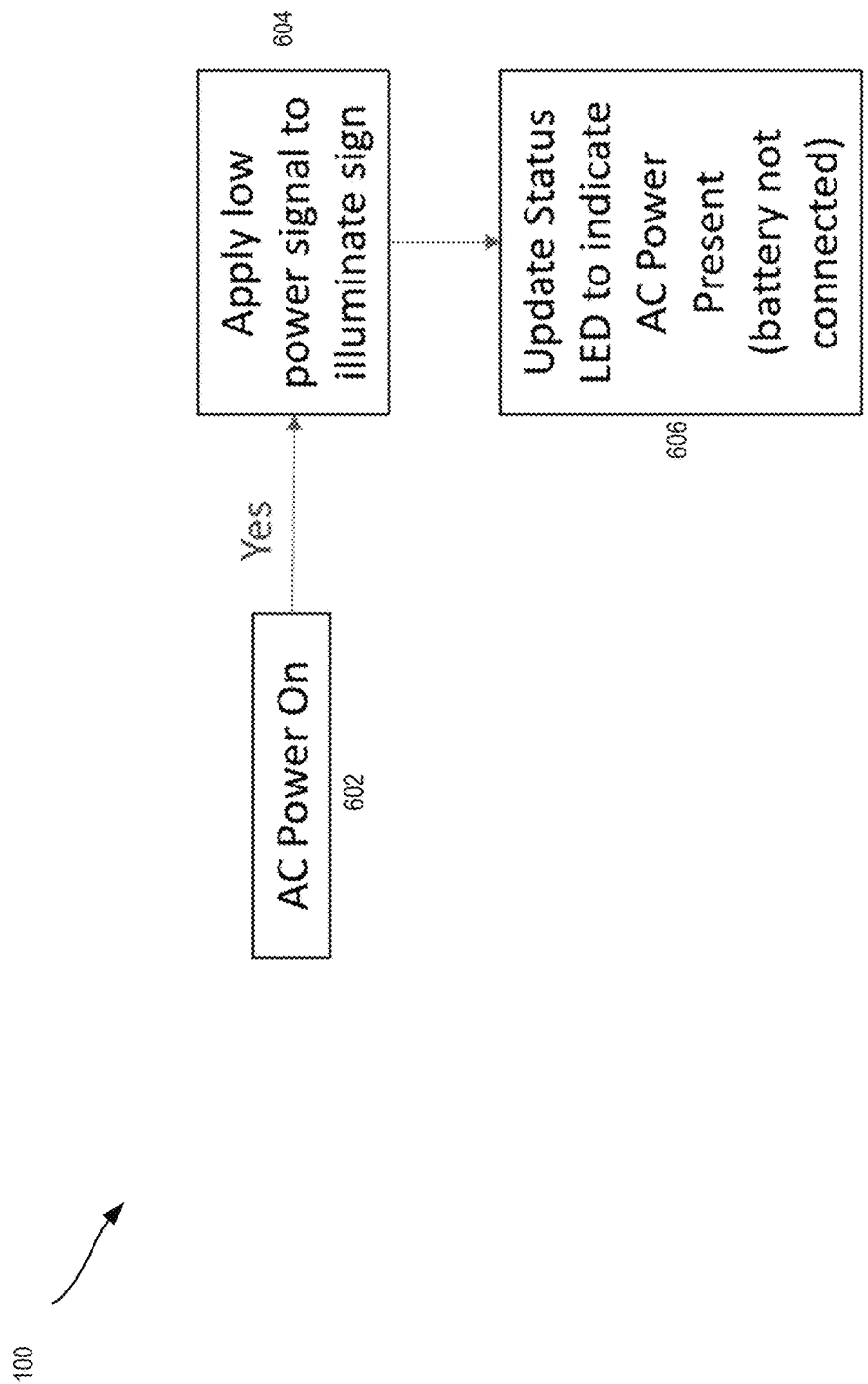
FIG. 6 is a flow diagram representing the operation of the lighting device controller in AC only mode, in accordance with an embodiment of the present invention.

FIG. 6 represents a flow diagram of a method 600 of the lighted device controller 120 for powering the lighted sign 110 when the switch 124 is set to the AC only position 128, in accordance with an embodiment of the present invention. The method 600 may be implemented using discrete electronic components, electronic circuitry, control logic, modules, firmware, or software. In an embodiment, the method 600 determines at method step 602 whether the AC power is present within the lighting device controller 120. If so, the method 600, at method step 604, applies power to illuminate the sign. At step 606, the status indicators 154 are updated to indicate that AC power is present in the lighting device controller 120.

In an embodiment where the method 600 determines at method step 602 that no AC power is present in the lighting device controller 120, the method 600 cannot power the lighted sign 110, since the battery 130 is not charged. This situation indicates that AC power is lost to the building where the light fixture 100 resides, and no alternate power source, such as a generator, is available to generate an alternate AC power input signal to the lighting device controller 120. In an embodiment, the lighting device controller 120 of the present invention avoids this scenario when the switch 124 is set to the battery backup position 126.

According to an embodiment of the present invention, a lighting device controller is disclosed. The lighting device controller receives a power signal from an AC power source and transmits a low voltage, lower power signal to a lighted sign to illuminate an instructional message. The lighting device controller includes a power supply, control circuitry, a battery, a switch, and a status indicator. The power supply transforms a high voltage AC power signal to a low voltage, low power signal. The switch can be set to either an AC only or battery backup position, indicating whether the lighting device controller provides a battery backup signal to the lighted sign. The status indicators indicate whether AC power is present in the lighting device controller, and whether the battery has power and is charging. When the switch is set to the battery backup position, the control circuitry transmits the low voltage, lower power signal generated by the power supply to the lighted sign and charges the battery. If AC power is lost while in the battery backup mode, the control circuitry causes the battery to discharge and transmit the low voltage, low power signal to the lighted sign.

According to another embodiment of the present invention, control circuitry within the lighting device controller is disclosed. The control circuitry is coupled to a power supply, a switch, a battery, a status indicator, and an output to a lighted sign. The lighting device controller receives a power signal from an AC power source and transmits a low voltage, lower power signal to the lighted sign to illuminate an instructional message. The power supply transforms the high voltage AC power signal to a low voltage, low power signal. The switch can be set to either an AC only or battery backup position, indicating whether the battery can be used as a backup source of power to the lighted sign. The control circuitry includes logic and circuitry to determine the position in which the switch is set, to determine whether AC power is present in the lighting device controller, to transmit control signals to the status indicator, and to transmit a charging signal to the battery. When the control circuitry detects that AC power is present in the lighting device controller and the switch is set to the battery backup position, the control circuitry transmits the low voltage, low power signal from the power supply to the output of the lighted device, and transmits a charging signal to the battery. When the control circuitry detects that AC power is lost and no longer present in the lighting device controller and the switch is set to the battery backup position, the control circuitry causes the battery to discharge and transmit the low voltage, low power signal from the battery to the output of the lighted device. When the control circuitry detects that AC power is no longer present in the lighting device controller and the switch is set to the AC only position, the control circuitry transmits the low voltage, low power signal from the power supply to the output of the lighted device, but does not transmit a charging signal to the battery.

According to an additional embodiment of the present invention, a method within the lighting device controller is disclosed. The lighting device controller receives a power signal from an AC power source and transmits a low voltage, lower power signal to a lighted sign to illuminate an instructional message. The lighting device controller includes a power supply, control circuitry, a battery, a switch, and a status indicator. The method transforms a high voltage AC power signal to a low voltage, low power signal using the power supply. The method determines whether the switch is set to either an AC only or battery backup position, indicating whether the lighting device controller provides a battery backup signal to the lighted sign. The method detects whether AC power is received at the power supply. When the switch is set to the battery backup position and the control circuitry detects AC power is present in the lighting device controller, the method transmits the low voltage, lower power signal generated by the power supply to the lighted sign and charges the battery. When the control circuitry detects AC power is lost and no longer present and the switch is set to the battery backup mode, the method transmits the low voltage, low power signal from the battery to the lighted sign. The method updates the status indicators to indicate whether AC power is present in the lighting device controller, and whether the battery has power and is charging.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The terms "circuitry, logic, control, and module" as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks. b v The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A lighting device controller within a lighting device, the lighting device controller receiving a higher voltage, alternating current (AC) power signal and providing a low voltage, low power signal to illuminate a lighted sign coupled to the lighting device controller, the lighting device controller comprising:
    a power supply for transforming the higher voltage, AC power signal into the low voltage, low power signal;
    control circuitry coupled to the power supply, the control circuitry detecting whether AC power is received within the lighting device controller, the control circuitry transmitting the low voltage, low power signal to the lighted sign when AC power is detected;
    a switch coupled to the control circuitry, the switch including a AC only position and a battery backup position; and
    a battery coupled to the control circuitry, the battery receiving a charging power signal from the control circuitry when the switch is set to the battery backup position, wherein:
        the control circuitry transmits a battery control signal to the battery when the control circuitry detects no AC power received in the lighting device controller and determines that the switch is set to the battery backup position, and the battery transmits the low voltage, low power signal to the lighted sign when receiving the battery control signal from the control circuitry; and
        the battery is disconnected and cannot receive a charging control signal from the control circuitry when the switch is set to the AC only position.

2. The lighting device controller of claim 1 further comprising:
    a status indicator coupled to the control circuitry, the status indicator receiving status control signals from the control circuitry indicating whether AC power is received in the lighting device controller and whether the battery is charging.

3. The lighting device controller of claim 2, wherein the status indicator further comprises:
    a first display indicating whether AC power is present in the lighting device controller, the first display lit to a first display first color when AC power is detected in the lighting device controller and lit to a first display second color or OFF when AC power is no longer detected in the lighting device controller; and
    a second display indicating whether the battery is charged, the second display lit to a second display first color when the battery is charging and lit to a second display second color when the battery is not charging or not charged sufficiently to illuminate the lighted sign.

4. The lighting device controller of claim 2, wherein the status indicator further comprises a single display, and wherein when the switch is in the AC only position the single display is lit to a first color when AC power is detected in the lighting device controller and the single display is lit to a second color or OFF when AC power is not present; and wherein, when the switch is in the battery backup position, the single display is lit to:
    the first color when the battery is present and charging or charged; and
    the second color or OFF when the battery is not present or has insufficient charge to deliver power to the lighted sign.

5. The lighting device controller of claim 1, wherein the control circuitry further comprises:
    switch position logic for determining whether the switch is set to the AC only or battery backup position; and
    power detecting logic for detecting whether AC power is received at the lighting device controller; and
    status control circuitry for generating and transmitting the status control signals to the status indicator.

6. A control circuitry included in a lighting device controller, the lighting device controller receiving a higher voltage, alternating current (AC) power signal and providing a low voltage, low power signal to illuminate a lighted sign, the lighting device controller coupled to the lighted sign, the control circuitry comprising:
    switch position logic for determining whether a switch is set to an AC only position or a battery backup position, the switch coupled to the control circuitry;
    power detecting logic for detecting whether AC power is received at the lighting device controller, the power detecting logic coupled to a power supply, the power supply transforming the higher voltage, AC power signal into the low voltage, low power signal and transmitting the low voltage, low power signal to the control circuitry;
    battery charging circuitry for generating and transmitting a charging power signal to a battery, the battery charging circuitry coupled to the battery, the battery charging circuitry further detecting whether the battery is charging; and
    battery control circuitry for generating and transmitting a battery control signal to the battery, wherein:
        the control circuitry transmits the low voltage, low power signal from the power supply to the lighted sign when the power detecting logic detects AC power is received at the power supply; and the battery charging circuitry transmits no charging power signal to the battery when the switch position logic determines the switch is set to the AC only position.

7. The control circuitry of claim 6, wherein the battery control circuitry uses battery power to provide low voltage, low power signal to the lighted sign if the switch is set to the battery backup position, and when the power detecting logic detects AC power is no longer received at the power supply.

8. The control circuitry of claim 6, further comprising status control circuitry for generating and transmitting status control signals to a status indicator, the status control circuitry coupled to the status indicator, the status control signals indicating whether the power detecting logic detects AC power received at the power supply, the status control signals further indicating whether the battery charging circuitry detects the battery is charging.

9. The control circuitry of claim 8, wherein the status indicator further comprises:
   a first display indicating whether AC power is present in the lighting device controller, the first display lit to a first display first color when AC power is detected in the lighting device controller and lit to a first display second color or OFF when AC power is no longer detected in the lighting device controller; and
   a second display indicating whether the battery is charged, the second display lit to a second display first color when the battery is charging and lit to a second display second color when the battery is not charging or not charged sufficiently to illuminate the lighted sign.

10. The control circuitry of claim 8, wherein the status indicator further comprises a single display, and wherein when the switch is in the AC only position the single display is lit to a first color when AC power is detected in the lighting device controller and the single display is lit to a second color or OFF when AC power is not present; and wherein, when the switch is in the battery backup position, the single display is lit to:
   the first color when the battery is present and charging or charged; and
   the second color or OFF when the battery is not present or has insufficient charge to deliver power to the lighted sign.

11. A method within a lighting device controller for providing a backup power source for illuminating a lighted sign coupled to the lighting device controller, the lighting device controller receiving a higher voltage, alternating current (AC) power signal and providing a low voltage, low power signal to the lighted sign, the method comprising:
   transforming the higher voltage, AC power signal into the low voltage, low power signal, using a power supply included within the lighting device controller;
   determining whether a switch included within the lighting device controller is set to a battery backup position or an AC only position, wherein:
      when it is determined that the switch is set to the battery backup position, charging a battery included in the lighting device controller using a charging power signal; and
      when it is determined that the switch is set to the AC only position, preventing charging of the battery; and
   transmitting the low voltage, low power signal to the lighted sign from the power supply when control circuitry detects that AC power is received at the power supply.

12. The method of claim 11, further comprising:
   updating a status indicator included within the lighting device controller using control signals generated in the control circuitry and transmitted to the status indicator, the status indicator indicating whether AC power is received at the power supply and whether the battery is charging.

13. The method of claim 12, wherein the control circuitry further comprises status control circuitry for generating and transmitting status control signals to the status indicator.

14. The method of claim 13, wherein the status indicator further comprises:
   a first display indicating whether AC power is present in the lighting device controller, the first display lit to a first display first color when AC power is detected in the lighting device controller and lit to a first display second color or OFF when AC power is no longer detected in the lighting device controller; and
   a second display indicating whether the battery is charged, the second display lit to a second display first color when the battery is charging and lit to a second display second color when the battery is not charging or not charged sufficiently to illuminate the lighted sign.

15. The method of claim 13, wherein the status indicator further comprises a single display, and wherein when the switch is in the AC only position the single display is lit to a first color when AC power is detected in the lighting device controller and the single display is lit to a second color or OFF when AC power is not present; and wherein, when the switch is in the battery backup position, the single display is lit to:
   the first color when the battery is present and charging or charged; and
   the second color or OFF when the battery is not present or has insufficient charge to deliver power to the lighted sign.

16. The method of claim 11, wherein the control circuitry further comprises:
   switch position logic for determining whether the switch is set to the AC only or battery backup position; and
   power detecting logic for detecting whether AC power is received at the power supply.

17. The method of claim 11, wherein the control circuitry further comprises:
   battery charging circuitry for generating and transmitting the charging power signal to the battery, the battery charging circuitry further detecting whether the battery is charging; and
   battery control circuitry for generating and transmitting the battery control signal to the battery.

18. The method of claim 11 further comprising transmitting the low voltage, low power signal to the lighted sign using the battery as the backup power source when the switch is set to the battery backup position and the control circuitry detects that no AC power is received at the power supply.

* * * * *